No. 814,960. PATENTED MAR. 13, 1906.
H. HEIBEL.
COFFEE URN.
APPLICATION FILED SEPT. 1, 1904.
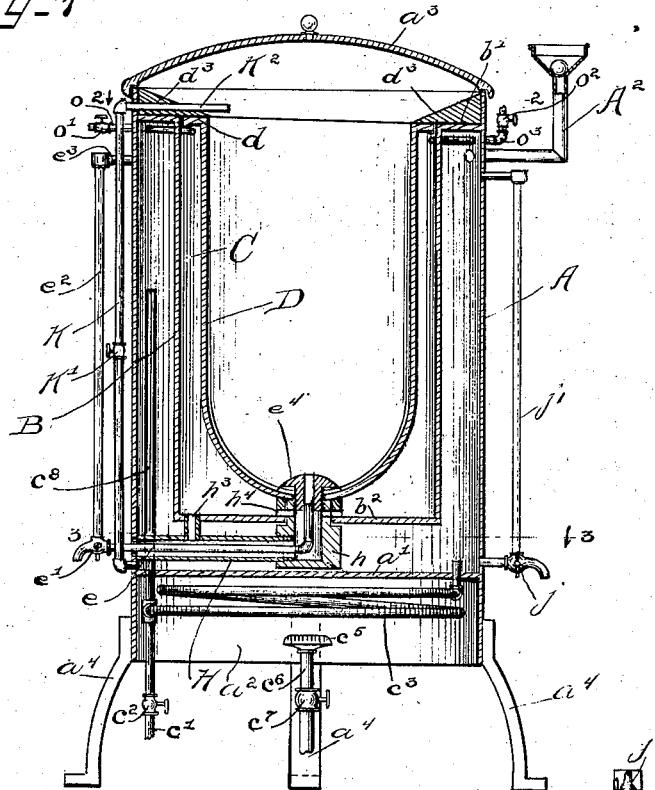
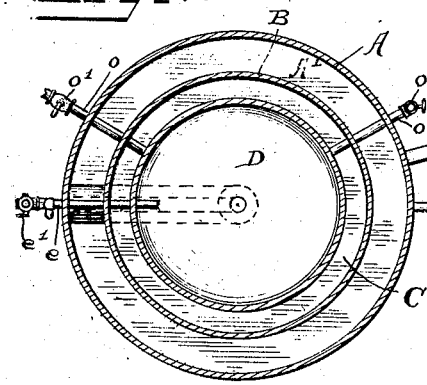
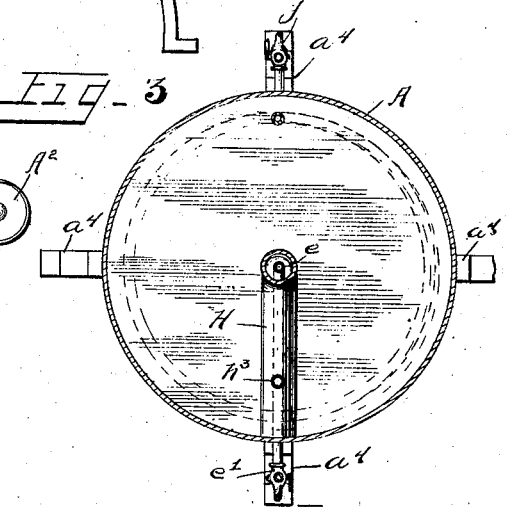
Witnesses:
J. W. Angell
F. Benjamin
Inventor
Henry Heibel
by Moore & Co.
Attys

UNITED STATES PATENT OFFICE.

HENRY HEIBEL, OF CHICAGO, ILLINOIS, ASSIGNOR, BY MESNE ASSIGNMENTS, TO COMBINATION URN MANUFACTURING COMPANY.

COFFEE-URN.

No. 814,960.   Specification of Letters Patent.   Patented March 13, 1906.

Application filed September 1, 1904. Serial No. 222,921.

*To all whom it may concern:*

Be it known that I, HENRY HEIBEL, a citizen of the United States, residing at Chicago, in the county of Cook and State of Illinois, have invented certain new and useful Improvements in Coffee-Urns, of which the following is a specification.

My invention relates to improvements in coffee-urns of the class usually employed in hotels and restaurants, and has for its principal objects to combine in a unitary structure or device a container in which the coffee is prepared and thereafter maintained at the proper temperature, a water-heater from which hot water may be drawn directly into the coffee-urn proper, as desired, and which will also serve as a source of hot-water supply for other purposes, and in which a single heating device may be used for both water and coffee, whereby the water may be boiled without boiling the coffee, thus economizing in the cost of construction and in the consumption of fuel and subserving many advantages in the use of the device.

A further object of my invention is to provide an apparatus for preparing beverages or infusions, such as coffee, wherein the temperature of the beverage may be kept or maintained practically constant and independently of a change in the temperature of a fluid in a heating-chamber.

It is customary for restaurants and hotels to employ an apparatus of relatively large capacity in preparing and dispensing beverages, particularly liquid coffee. Difficulty has been experienced in keeping the beverage or infusion at a practically constant temperature, this latter condition being necessary to the preservation of the palatable quality of the infusion, thereby preventing waste by deterioration and the loss of the fuel required to again heat the infusion to the proper temperature. This is due in some cases to the introduction of cold water into the apparatus, which results in lowering the temperature of the heating-bath, and consequently of the beverage-container. In other instances the fluid or bath in a heating-chamber is raised to an excessive temperature, in consequence of which the beverage within the infusion-chamber is also unduly heated, raised sometimes to the boiling-point. Commonly the urn or apparatus is exposed to the direct heat of a plurality of burners, which not only consume a relatively large volume of fuel, but the apparatus deteriorates within a short time under the direct application of the heat. I seek to overcome these practical objections by the provision of a novel form of apparatus, the same being characterized by the employment of a chamber intervening the beverage-container or infusion-chamber and a heating-chamber. This intervening chamber overcomes heating of the beverage container should the temperature of the heating-chamber be raised to an excessive heat, while at the same time the beverage-container is exposed to the heat produced in the surrounding heating-chamber.

It is desired under some conditions to utilize the intervening chamber for the circulation of a medium, such as air, around and in contact with the beverage or infusion chamber for the purpose of overcoming undue heating of the beverage in the infusion-chamber; but ordinarily it will be found sufficient to confine an intervening body or stratum in the chamber intervening the infusion container or chamber and the heating-chamber.

The device consists generally of an outer tank adapted to hold water and forming a water-chamber around an air-chamber, which in turn surrounds the coffee container or urn proper, and a heater or burner which is arranged under the water-tank. Various pipes, gages, and cocks, some of which are common to such devices, complete the structure.

In the accompanying drawings, which form a part of this application, I have shown a preferred adaptation of my invention in the following views: Figure 1 is a vertical section of my improved urn complete. Fig. 2 is a cross-section on the line 2 2 of Fig. 1. Fig. 3 is a cross-section on the line 3 3 of Fig. 1.

Referring to the details of the drawings, A represents the outer cylindrical jacket, which is provided with a raised bottom $a'$, thus leaving a chamber $a^2$ below the bottom, in which is housed the heating devices to be described. A suitable cover $a^3$ is applied to the top of the jacket, and legs $a^4$ are secured to the lower part. Arranged within the jacket and suitably spaced therefrom is a second jacket B, formed with a closed bottom $b^2$ and with its upper edges flanged outwardly, as at $b'$, to bridge the space between the walls of the two jackets A and B, thus providing a chamber which is adapted to hold the water to be boiled and which is closed, except as hereinafter stated.

Arranged within the jacket B and suitably spaced from the walls thereof is the coffee-container D, which is formed with the usual rounded bottom and has its upper edge flanged outwardly to form a closure between its sides and the adjacent sides of the jacket B, thus forming a chamber C, which serves as an air-chamber around the container D and which is provided with means for regulating the temperature of the air therein, as will be described.

Arranged below the bottom $a'$ and within the chamber $a^2$ is a coil of water-pipe $c^3$, one end of which communicates with the interior of the water-chamber and the other end with a water-supply pipe $c'$, in which is a valve $c^2$, by which the supply of water to the coil and the water-chamber is manually controlled. Below the center of the coil is a gas-burner $c^5$, which is connected with a gas-supply pipe $c^6$, in which is a valve $c^7$, by which the supply of gas is controlled in the usual manner. Communicating with the water-chamber is a water-gage $j'$ and a cock $j$, the latter serving to draw off water, as may be desired. Communicating with the upper part of the water-chamber is the usual safety relief-pipe $A^2$. Communicating with the lower part of the water-chamber is a pipe $k$, the upper end of which leads directly over the coffee-container. This pipe is supplied with a hand-valve $k'$, by which is controlled the passage of the water from the water-chamber to the container, such passage being normally effected, as will be readily understood, by the expansion of the water from heat furnished by the burner.

In the bottom of the coffee-container is a hollow screw $e^4$, with which communicates the inner end of a pipe $e$, on the outer end of which is a cock $e'$, from which the coffee is drawn as required. The usual coffee-gage $e^2$ is secured to the side of the casing A and communicates with the pipe $e$ through the cock $e'$. To prevent the water from boiling the coffee in the horizontal portion of the pipe $e$, I surround the latter with a water-tight pipe H, which communicates with the air-chamber C through the short pipe $h^3$ and has its inner end screwed into a boxing $h$, which surrounds the vertical portion of the pipe $e$ and protects same from the heat of the water in the water-chamber. The boxing is of greater diameter than the pipe, thus forming a chamber around the latter, and is formed with a threaded extension into which is screwed the hollow screw $e^4$, through which a vertical opening is formed which registers with the upper end of the pipe $e$. Small holes $h^4$ are drilled through the extension of the boxing and permit air to pass from the pipe H to the chamber C, thus effecting a circulation of air at this point.

To provide for the constant circulation of the water from the water-chamber through the coil, and thus keep it at the desired temperature with the minimum heat at the burner, I extend the pipe $c'$ upwardly, as at $c^8$, with the free end of the extension communicating with the upper part of the chamber.

To effect a circulation of air in the chamber C, I introduce into the upper part of same at opposite points pipes $o$ $o^3$, which are respectively supplied with valves $o'$ $o^2$, so when the valves are opened the hot air in the chamber may escape and in its place atmospheric air admitted, thus reducing the temperature within the chamber and preventing the coffee from being raised to the temperature of the water in the water-chamber. I further augment the circulation of air in the air-chamber by providing openings through the jacket at a point around the pipe H.

A packing-ring $d^3$ of any suitable material is placed over the flanges $b'$ and $d$, thereby affecting air and water tight joints between said parts.

The container will be supplied with the usual coffee-bag, (not shown,) and when same is filled with ground coffee and the water in the water-chamber heated to the proper temperature by opening the valve $k'$ the hot water will flow from the upper end of the pipe $k$ into the bag and percolating through the coffee will drop into the container D, from which it will be drawn through the hollow screw $e^4$, pipe $e$, and cock $e'$ in the usual manner. When sufficient water has been introduced into the coffee, the valve $k'$ is closed until a further supply is needed.

It will be apparent from the nature of my invention that any other fluid or substance of low conductivity may be substituted for air in the chamber C without materially affecting the operation of my invention.

Having thus described my invention, what I claim as new, and desire to obtain by Letters Patent, is—

1. In an apparatus of the class described, an outer jacket and an inner jacket with a space between forming a water-chamber, a beverage-container arranged within the inner jacket and spaced therefrom to form an air-chamber, a draw-off pipe connecting with said beverage-container, said draw-off pipe being centrally arranged within a larger pipe adapted to form an air-chamber surrounding the draw-off pipe and connecting with the air-chamber surrounding said beverage-container and means for heating the water in the water-chamber.

2. In an apparatus of the class described, an outer jacket and an inner jacket with a space therebetween forming a water-chamber, a beverage-container arranged within the inner jacket and spaced therefrom to form an air-chamber, means for heating the water in the water-chamber, and means for effecting a circulation of air in the air-chamber.

3. In an apparatus of the class described, an outer and an inner jacket with a space therebetween forming a water-chamber, a beverage-container arranged within said water-chamber and spaced therefrom to form an air-chamber, a beverage-draw-off pipe, an air-chamber surrounding said draw-off pipe, and connecting with the said first-mentioned air-chamber, means for effecting a circulation of air in the said chambers and means for heating the water in said water-chamber.

4. In an apparatus of the class described, an outer jacket and an inner jacket with a space therebetween forming a water-chamber, a beverage-container arranged within the inner jacket and spaced therefrom to form an air-chamber, means for heating the water in the water-chamber, means for effecting a circulation of air in the air-chamber, and means for controlling the circulation of air in the air-chambers.

5. In an apparatus of the class described, an outer jacket closed at the top and bottom, an inner jacket spaced and sealed from the outer jacket to form a chamber, means for introducing water to said chamber and means for heating the water in said chamber, a beverage-container arranged within said inner jacket and spaced and sealed therefrom to form a chamber, means for introducing air to said chamber and means for withdrawing air from said chamber, and means for conducting water from said water-chamber to said beverage-container.

6. In an apparatus of the class described, an outer jacket closed at the top and bottom, an inner jacket spaced and sealed from said outer jacket to form a chamber, means for introducing water to said chamber, means for heating the water in said chamber, and means for effecting a circulation of water in said chamber, a beverage-container arranged within said inner jacket and spaced therefrom, means for conducting water from said water-chamber to said container and means for controlling the introduction of water to said container.

7. In an apparatus of the class described, an outer jacket closed at the top and bottom, an inner jacket spaced and sealed from said outer jacket to form a chamber, means for introducing water to said chamber, means for heating the water in said chamber, and means for effecting a circulation of water in said chamber, a beverage-container arranged within said inner jacket and spaced therefrom, means for conducting water from said water-chamber to said container said means being a pipe and leading from one to the other, and means for opening and closing said pipe.

8. In an apparatus of the class described, an outer jacket closed at the top and bottom, an inner jacket spaced and sealed from said outer jacket to form a chamber, means for introducing water to said chamber, means for heating the water in said chamber, means for effecting a circulation of water in said chamber through a coil-heater beneath said chamber, and means for controlling the supply of water to said chamber, a beverage-container arranged within said inner jacket and spaced therefrom, means for conducting water from said water-chamber to said container said means being a pipe and leading from one to the other, and means for opening and closing said pipe.

9. In an apparatus of the class described, a water-chamber, a beverage-container arranged within said water-chamber and spaced therefrom to form an air-chamber, a beverage-draw-off pipe, an air-chamber surrounding said draw-off pipe, and means for heating the water in said water-chamber.

10. In an apparatus of the class described, a water-chamber, a beverage-container arranged within said water-chamber and spaced therefrom to form an air-chamber, a beverage-draw-off pipe, an air-chamber surrounding said draw-off pipe and means for heating the water in said water-chamber.

11. In an apparatus of the class described, a water-chamber, a beverage-container arranged within said water-chamber and spaced therefrom to form an air-chamber, a beverage-draw-off pipe, an air-chamber surrounding said draw-off pipe, means for effecting a circulation of air in said air-chambers, and means for heating the water in said water-chamber.

12. In an apparatus of the class described, a water-chamber, a beverage-container arranged within said water-chamber and spaced therefrom to form an air-chamber, a beverage-draw-off pipe, an air-chamber surrounding said draw-off pipe, and means for effecting and means for controlling the circulation of air in said air-chambers, and means for heating the water in said water-chamber.

13. In an apparatus of the class described, a chamber adapted to contain a heating medium, a beverage-container exposed to the action of said chamber, an independent chamber intervening the two first-mentioned chambers, means for establishing the circulation of a cooling medium in the intervening chamber, and means for interrupting said circulation.

In testimony whereof I affix my signature in presence of two witnesses.

HENRY HEIBEL.

Witnesses:
F. BENJAMIN,
WM. B. MOORE.